(12) United States Patent
Nakagawa et al.

(10) Patent No.: US 9,146,635 B2
(45) Date of Patent: Sep. 29, 2015

(54) TOUCH PANEL EQUIPPED DISPLAY DEVICE AND CONTROL METHOD FOR SAME

(75) Inventors: Yousuke Nakagawa, Osaka (JP);
Kazuhiro Maeda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 120 days.

(21) Appl. No.: 14/110,769

(22) PCT Filed: Apr. 9, 2012

(86) PCT No.: PCT/JP2012/059727
§ 371 (c)(1),
(2), (4) Date: Oct. 9, 2013

(87) PCT Pub. No.: WO2012/141148
PCT Pub. Date: Oct. 18, 2012

(65) Prior Publication Data
US 2014/0028627 A1      Jan. 30, 2014

(30) Foreign Application Priority Data

Apr. 15, 2011  (JP) ................................. 2011-091537

(51) Int. Cl.
| | |
|---|---|
| G06F 3/041 | (2006.01) |
| G09G 3/36 | (2006.01) |
| G06F 3/044 | (2006.01) |
| G02F 1/1333 | (2006.01) |

(52) U.S. Cl.
CPC .............. *G06F 3/0412* (2013.01); *G06F 3/044* (2013.01); *G06F 3/0416* (2013.01); *G09G 3/3648* (2013.01); *G02F 1/13338* (2013.01); *G09G 3/3688* (2013.01); *G09G 2310/0297* (2013.01); *G09G 2310/08* (2013.01)

(58) Field of Classification Search
CPC ..... G06F 3/044; G06F 3/0412; G06F 3/0416; G06F 3/041
USPC ................................................... 345/173, 174
See application file for complete search history.

(56) References Cited

U.S. PATENT DOCUMENTS

| | | | | |
|---|---|---|---|---|
| 2009/0256820 | A1* | 10/2009 | Yanase et al. | 345/174 |
| 2011/0063238 | A1* | 3/2011 | Liu et al. | 345/173 |
| 2011/0193820 | A1* | 8/2011 | Chen et al. | 345/174 |
| 2013/0176251 | A1* | 7/2013 | Wyatt et al. | 345/173 |

FOREIGN PATENT DOCUMENTS

JP        H5-313607 A       11/1993

* cited by examiner

*Primary Examiner* — Koosha Sharifi-Tafreshi
(74) *Attorney, Agent, or Firm* — Chen Yoshimura LLP

(57) ABSTRACT

Provided is a touch panel-equipped display device (10) including: a touch panel (14); a display part (12) including source bus lines (25); a source bus line potential switching part that switches the potential of each source bus line (25) in a source bus line potential switching period (54) that is a partial period of a vertical blanking period (51); and a sensing part that performs sensing for a touch panel in a sensing period (53) that is a period in the vertical blanking period (51) other than the partial period.

6 Claims, 16 Drawing Sheets

FIG. 2
(a)
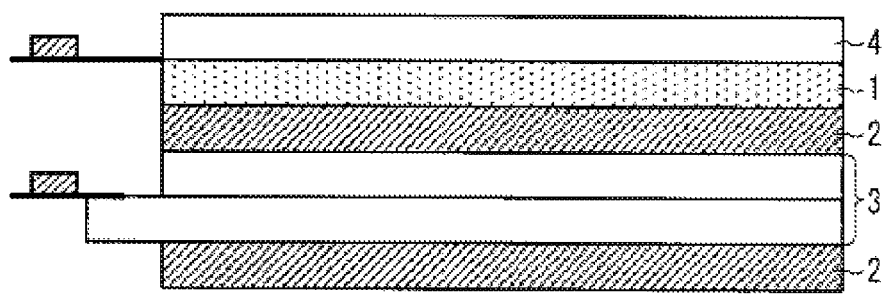
(b)
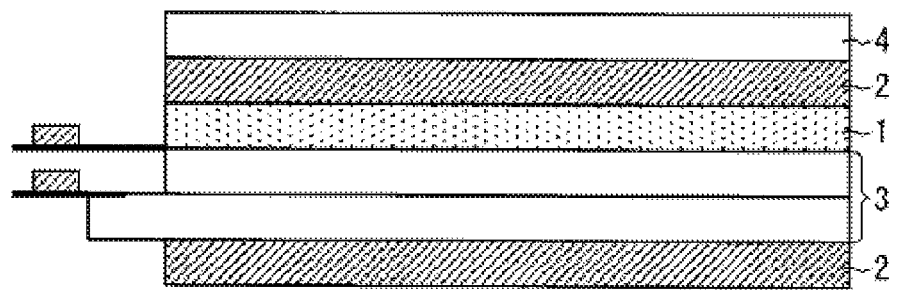
(c)
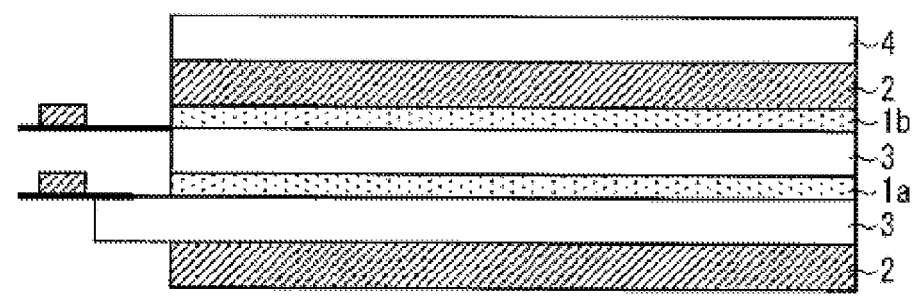
(d)
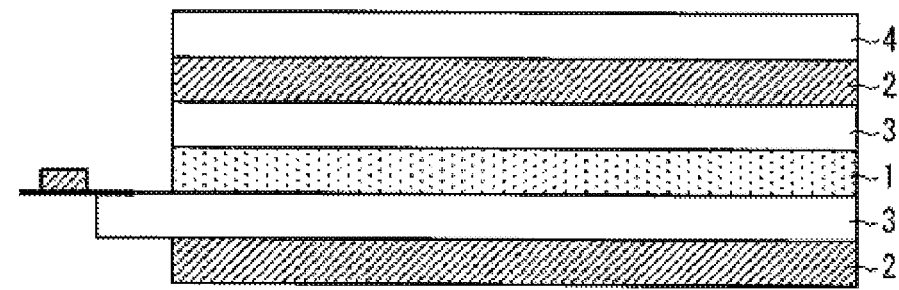

FIG. 3
(a)
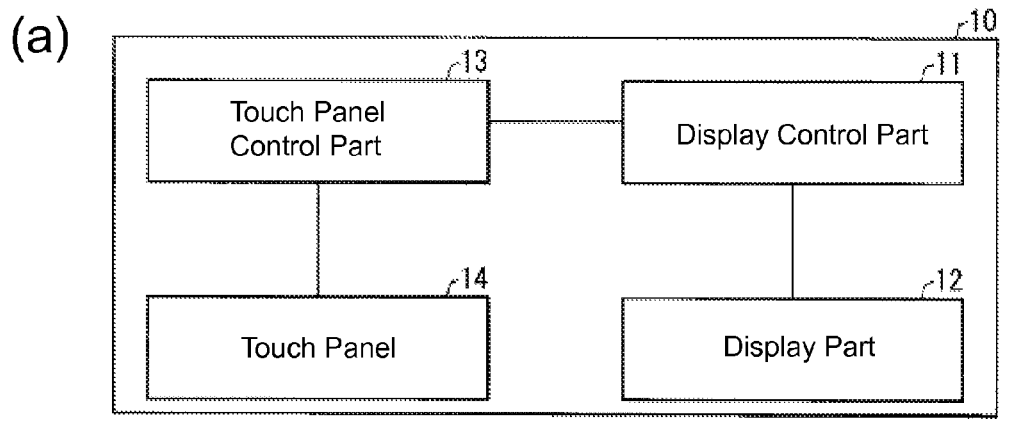
(b)
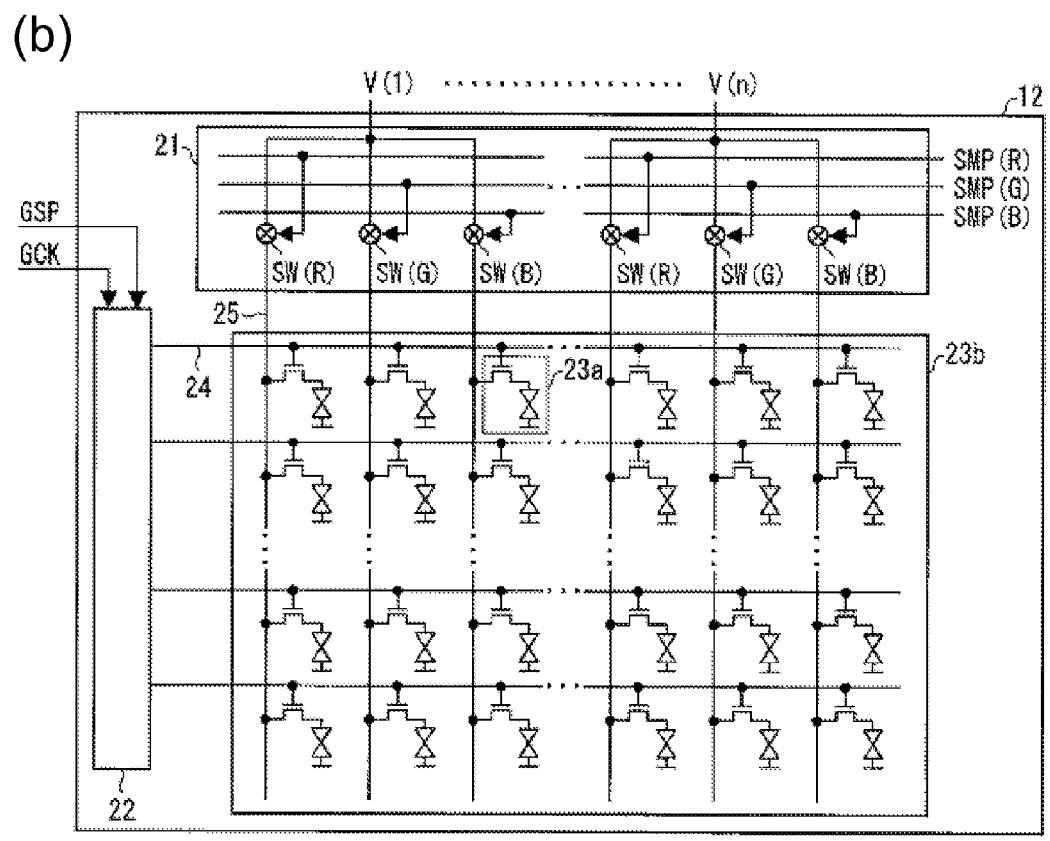

FIG. 4
(a)
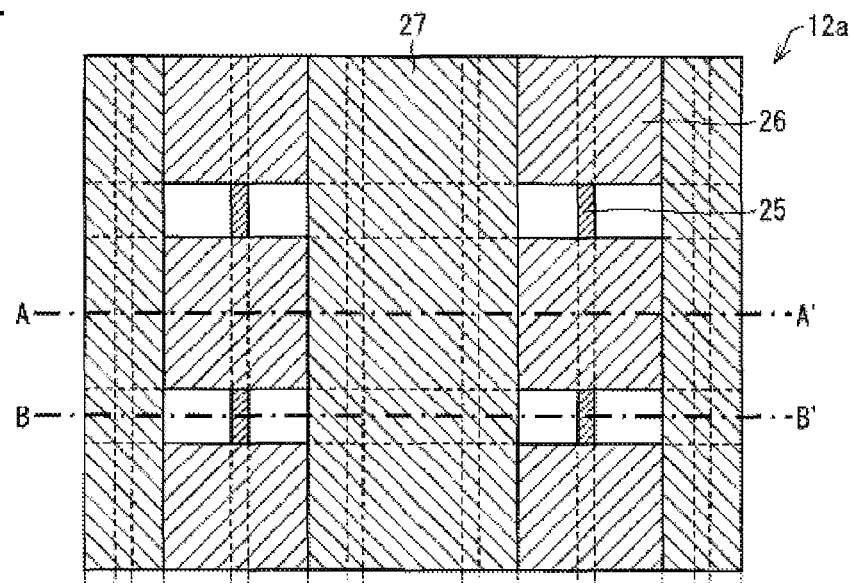
(b)
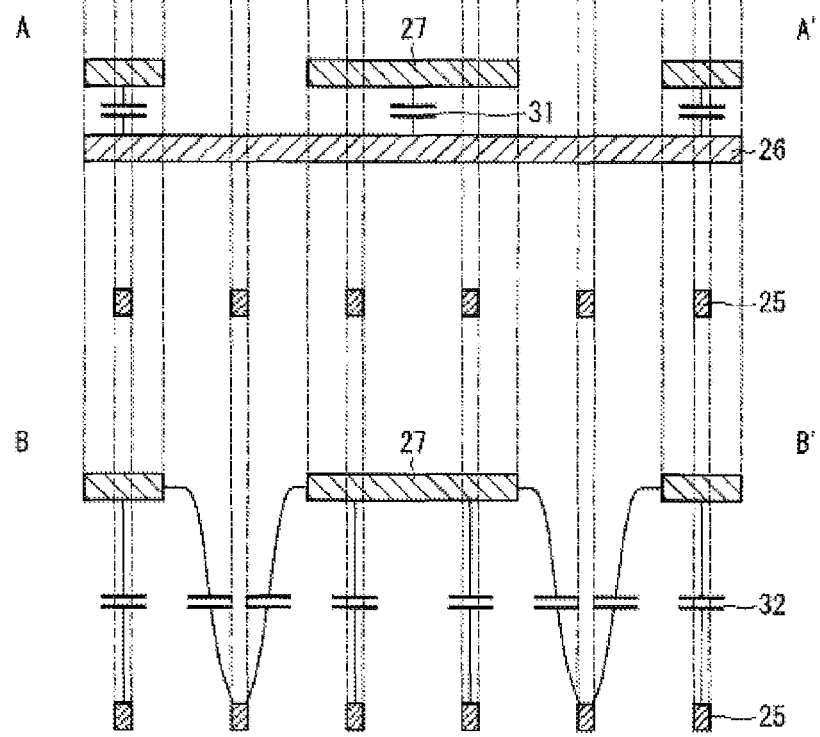

FIG. 5
(a)
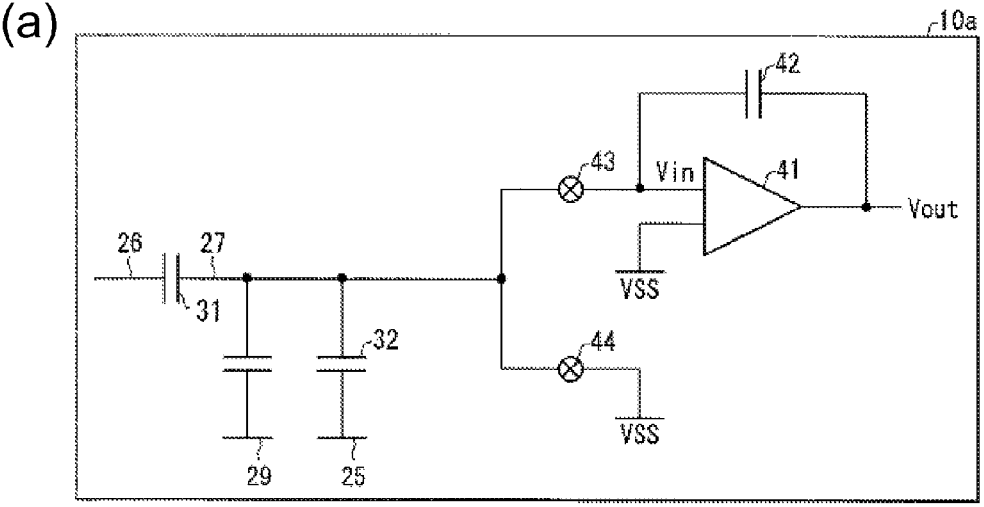
(b)
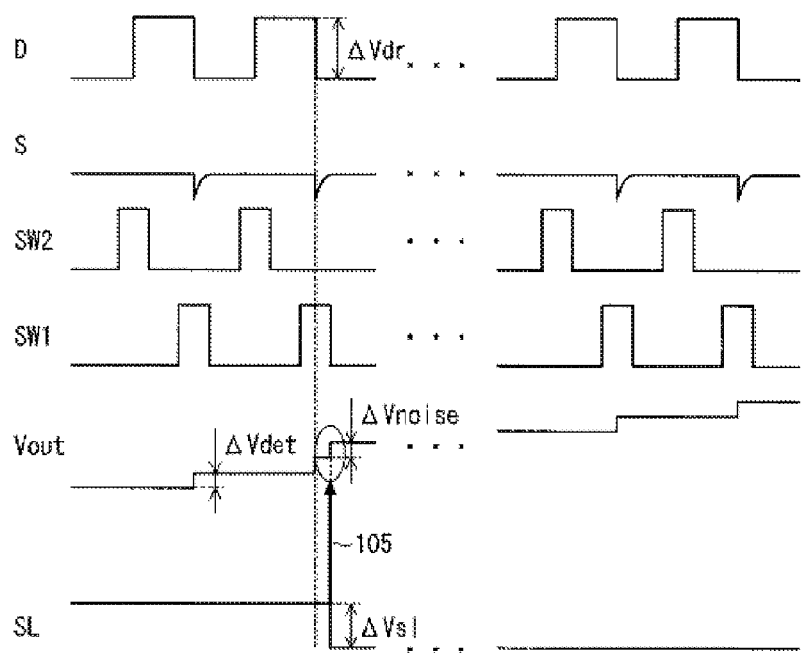

FIG. 6
(a)
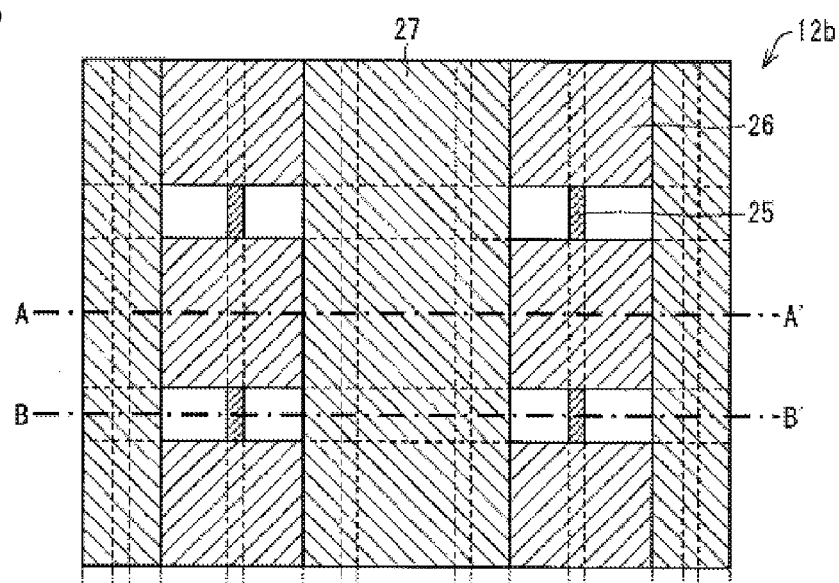
(b)
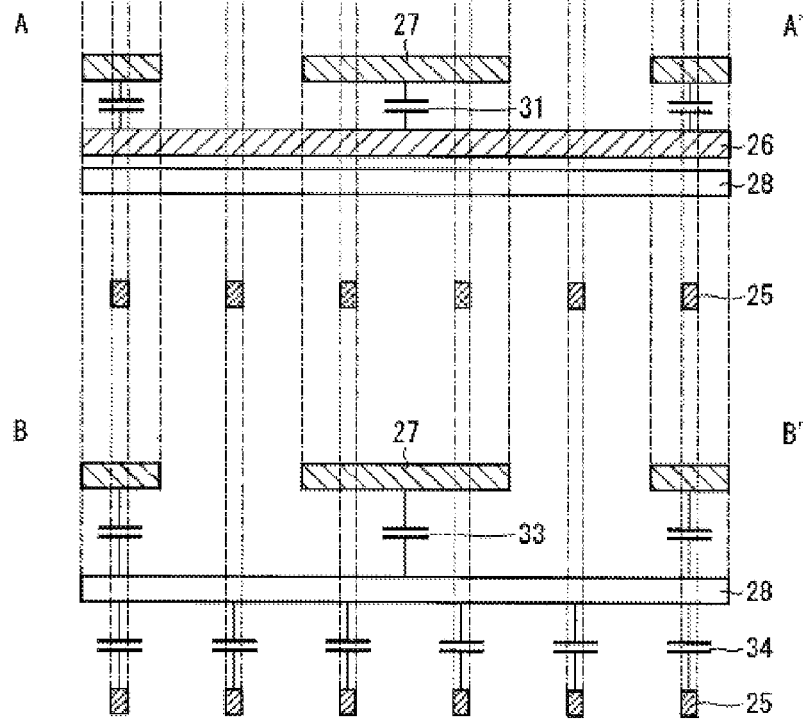

FIG. 10
(a)
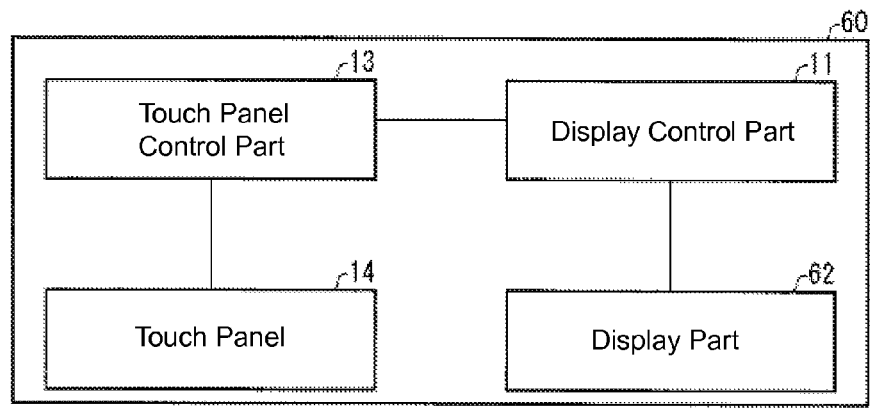
(b)
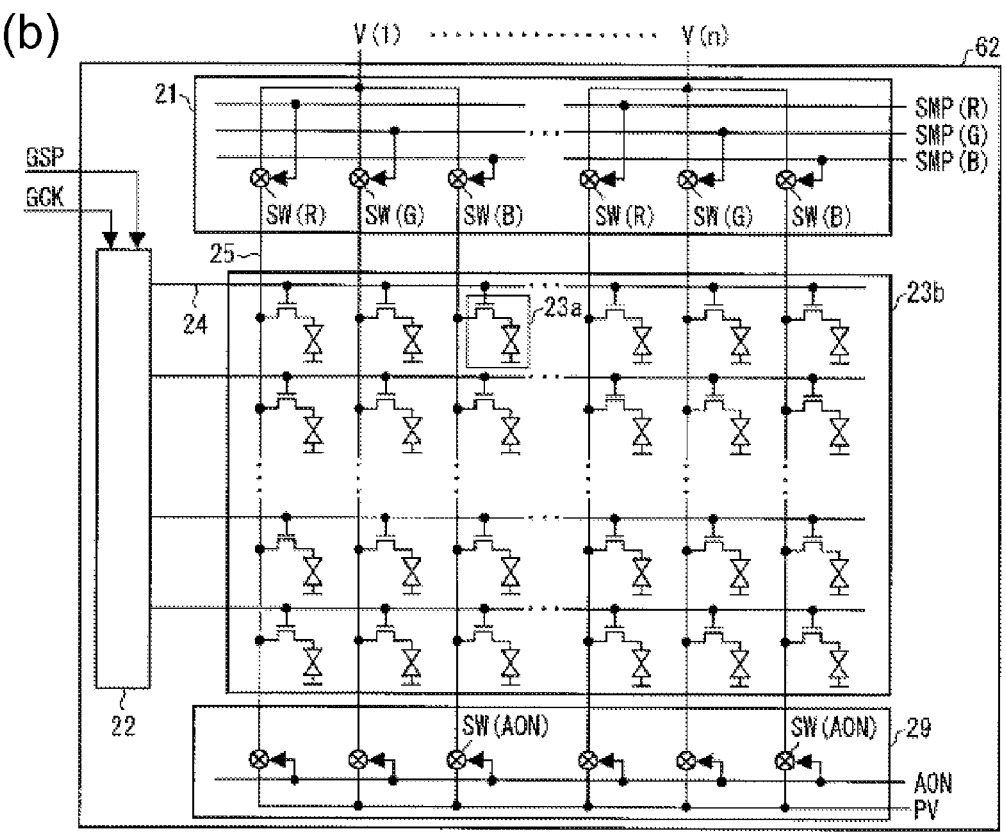

FIG. 11
(a)
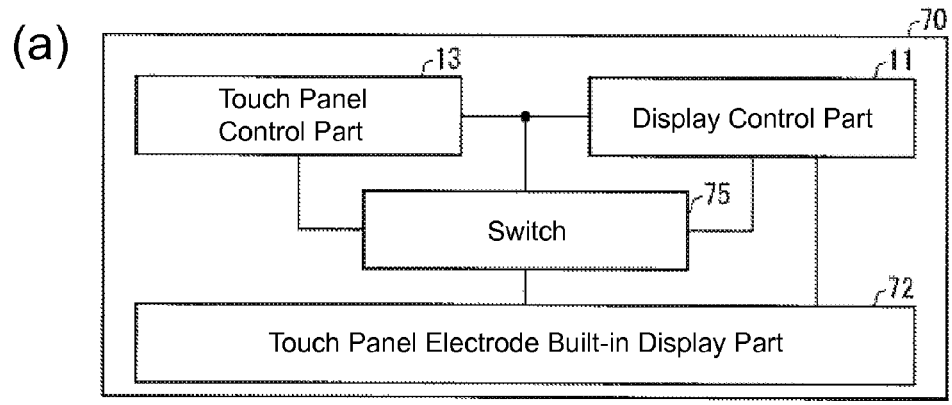
(b)
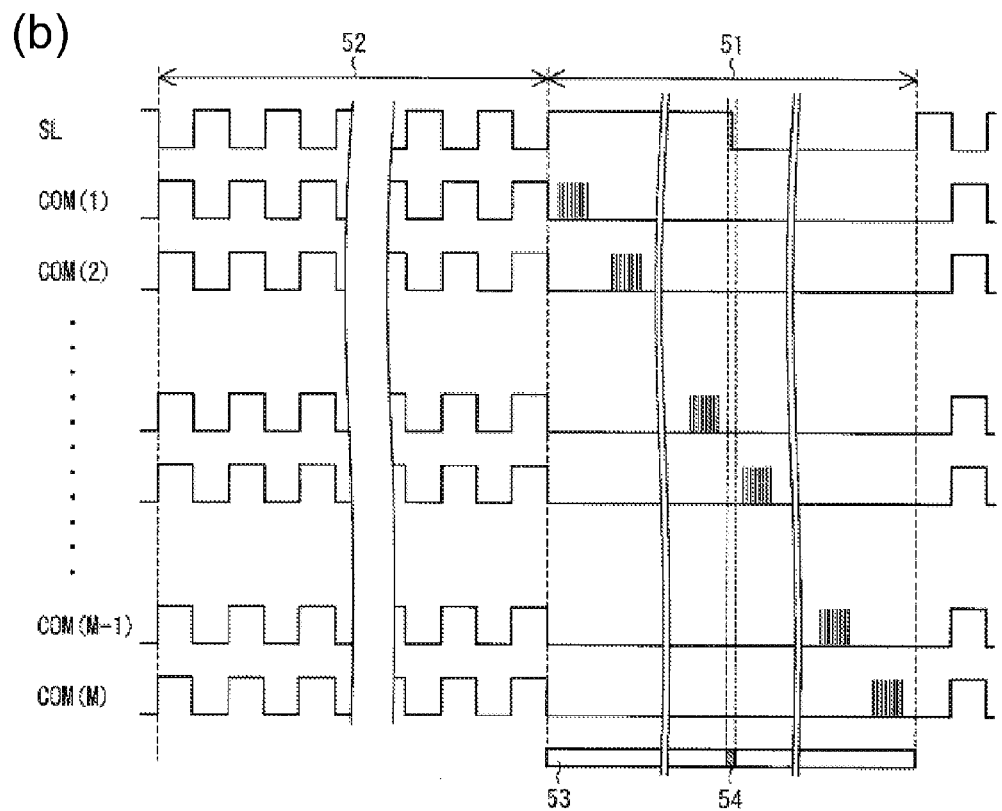

TOUCH PANEL EQUIPPED DISPLAY DEVICE AND CONTROL METHOD FOR SAME

TECHNICAL FIELD

The present invention relates to a touch panel-equipped display device and a control method therefor.

BACKGROUND ART

In recent years, a touch panel-equipped display device in which a display device is combined with a touch panel is put in practical use, and is used for a wide variety of applications. Touch panels have various types, but among them, capacitive type touch panels are widely used.

In a touch panel-equipped display device, in order to detect an object to be detected reliably, it is effective to remove noise from a signal detected by a detection electrode. By removing noise, a change in output signals between when an object to be detected is detected and when an object to be detected is not detected can be made clearer. This makes it possible to discern a detection state from a non-detection state more reliably. In other words, by increasing S/N ratio by removing noise components from a signal detected by a detection electrode, the sensitivity of the touch panel can be improved.

A display device is not always driven or scanned for performing image display. In one frame of an image, there is a period called a vertical blanking period, in addition to a display period. In the case of LCDs, for example, during the vertical blanking period, pixels merely hold the states written by thin film transistors (TFTs), and therefore, an environment with little noise for a touch panel is realized. Thus, by conducting a sensing operation of a touch panel during this vertical blanking period, it is expected that noise detected by a detection electrode of the touch panel is reduced.

On the other hand, the vertical blanking period for a display device is a period during which a certain display state is maintained, but if all operations are stopped, it is not possible to maintain the display state in a desired manner (Patent Document 1). In the case of LCDs, for example, each pixel is provided with a storage capacitance to maintain a display state written into by a TFT, but the accumulated charges are discharged over time. This causes brightness of each pixel to change over time, resulting in flickering, and display quality is thereby lowered.

Patent Document 1 discloses a technology for eliminating a difference in brightness among pixels by inverting an output voltage of a display signal circuit (13) (source bus line below) for every horizontal scanning period during the vertical blanking period.

RELATED ART DOCUMENT

Patent Document

Patent Document 1: Japanese Patent Application Laid-Open Publication, "Japanese Patent Application Laid-Open Publication No. H5-313607 (Published on Nov. 26, 1993)

SUMMARY OF THE INVENTION

Problems to be Solved by the Invention

However, when adopting the above-mentioned two configurations in a touch panel-equipped display device, i.e., conducting sensing for a touch panel and inverting an output voltage of the source bus line during the vertical blanking period, additional noise becomes a problem.

FIG. 16 shows a conventional touch panel-equipped display device 100. In the example of the figure, a sheet-shaped touch panel 101 is bonded onto the display device. In the touch panel-equipped display device 100, source bus lines and detection electrodes of a touch panel are coupled via a constant capacitance 105. Therefore, if the sensing period for the touch panel and the potential switching period for the source bus lines overlap, electrical charges are induced in the detection electrodes through the capacitance 105, and the electrical charges become noise when detecting a touch. Below, the capacitance may also be referred to as capacitive coupling.

FIG. 17 is a timing chart in driving the touch panel in the touch panel-equipped display device 100. The touch panel-equipped display device 100 is provided with driving electrodes and detection electrodes arranged in a matrix, and an M number of driving electrodes are denoted by D(1), D(2), ..., D(M-1), D(M). The driving electrodes D(1) to D(M) generate driving pulses in a sequential manner during a vertical blanking period 151, but there are timings 106 at which the driving pulses and the potential switching periods for the source bus line (SL) overlap.

Because of the presence of the overlapping timings 106, electrical charges are induced in the detection electrodes of the touch panel through capacitive coupling 105, resulting in noise, which worsens the detection sensitivity.

In addition to the structure in which a touch panel is bonded onto a display device as shown in FIG. 16, structures of the touch panel-equipped display device include on-cell type and in-cell type. The on-cell type and in-cell type touch panel-equipped display devices can reduce the thickness of the device itself.

On the other hand, such configurations are more susceptible to an effect of the potential switching of the source bus lines because the distance between the source bus lines and the touch panel detection electrodes is reduced, which strengthens the capacitive coupling 105. For this reason, in the on-cell type and in-cell type touch panel-equipped display devices, there is a stronger need for a solution to the above-mentioned problem.

The present invention was made to solve the above-mentioned problem, and an object thereof is to provide a touch panel-equipped display device in which an effect of noise generated by switching the potential of the source bus lines is eliminated, thereby achieving highly sensitive touch detection, and a control method therefor.

Means for Solving the Problems

In order to solve the above-mentioned problem, a touch panel-equipped display device of an embodiment of the present invention includes: a touch panel; a display unit having source bus lines; a source bus line potential switching unit that switches a potential of the source bus lines at a switching timing at which the potential of the source bus lines is switched, the switching timing occurring during a vertical blanking period of the display device; and a sensing unit that conducts sensing for the touch panel in a sensing period that is a period in the vertical blanking period, wherein the sensing period and the switching timing are set such that the sensing period does not overlap the switching timing.

With this configuration, in the touch panel-equipped display device according to one embodiment of the present invention, a period for sensing the touch panel and a period for switching the potential of the source bus line do not overlap. This makes it possible to conduct sensing for the touch panel without being affected by the potential switching (changing) of the source bus lines. As a result, highly sensitive touch detection can be achieved.

In order to solve the above-mentioned problem, a control method for a touch panel-equipped display device of one embodiment of the present invention is a control method for a touch panel-equipped display device provided with a touch panel and a display unit having source bus lines, the method including: a source bus line potential switching step of switching a potential of the source bus lines at a switching timing at which the potential of the source bus lines is switched, the switching timing occurring during a vertical blanking period of the display device; and a sensing step of conducting sensing for the touch panel during a sensing period that is a period of the vertical blanking period, wherein the sensing period and the switching timing are set such that the sensing period does not overlap the switching timing.

With the above-mentioned configuration, in the touch panel-equipped display device, it is possible to eliminate an effect of noise caused by the potential switching of the source bus lines, and it is possible to achieve highly sensitive touch detection.

Additional objects, features, and effects of the present invention shall be readily understood from the descriptions that follow. Advantages of the present invention shall become apparent by the following descriptions with reference to the appended drawings.

Effects of the Invention

The present invention has an effect of improving the detection sensitivity of a touch panel in a touch panel-equipped display device.

BRIEF DESCRIPTION OF THE DRAWINGS

FIG. 2 schematically shows configurations of touch panel-equipped display devices. FIG. 2(*a*) shows a typical touch panel-equipped display device in which a touch panel is disposed on a display device. FIG. 2(*b*) shows an on-cell type touch panel-equipped display device. FIGS. 2(*c*) and 2(*d*) show an in-cell type touch panel-equipped display device.

FIG. 3(*a*) is a block diagram showing a touch panel-equipped display device of one embodiment of the present invention. FIG. 3(*b*) shows a configuration of a display part provided in the touch panel-equipped display device.

FIG. 4 schematically shows a display part that uses an IPS-type LCD as a display device. FIG. 4(*a*) is a top view. FIG. 4(*b*) shows cross-sectional views along the line A-A' and along the line B-B' of FIG. 4(*a*).

FIG. 5(*a*) shows an equivalent circuit of a touch panel-equipped display device that has a display part using an IPS-type LCD. FIG. 5(*b*) shows a timing chart in the touch panel-equipped display device.

FIG. 6 schematically shows a display part that uses a VA-type LCD as a display device. FIG. 6(*a*) is a top view. FIG. 6(*b*) shows cross-sectional views along the line A-A' and along the line B-B' of FIG. 6(*a*).

FIG. 7(*b*) shows a timing chart in the touch panel-equipped display device.

FIG. 10(*a*) is a block diagram showing a touch panel-equipped display device of one embodiment of the present invention. FIG. 10(*b*) shows a configuration of a display part provided in a touch panel-equipped display device of one embodiment of the present invention.

FIG. 11(*a*) is a block diagram showing an in-cell type touch panel-equipped display device of one embodiment of the present invention. FIG. 11(*b*) is a timing chart of a touch panel-equipped display device of one embodiment of the present invention.

Figure 1:
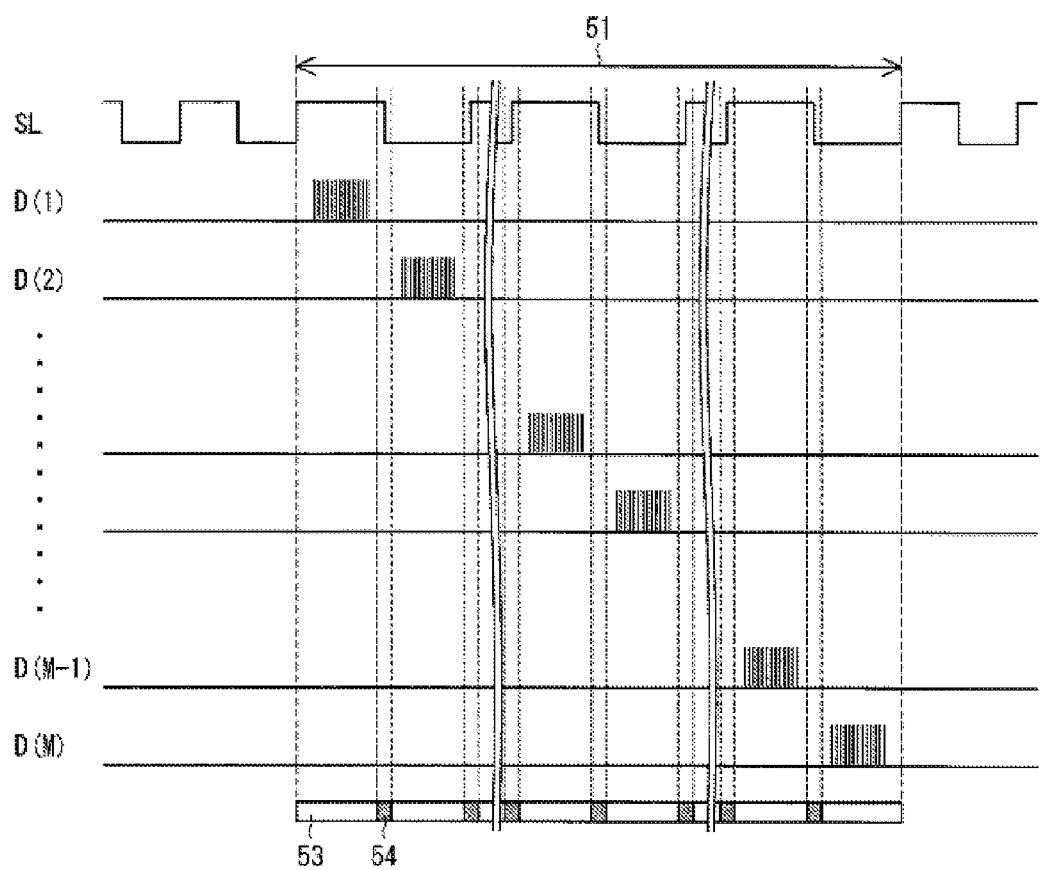
FIG. 1 shows a timing chart of a driving signal for a touch panel and a source bus line signal in a touch panel-equipped display device of one embodiment of the present invention.
Figure 7:
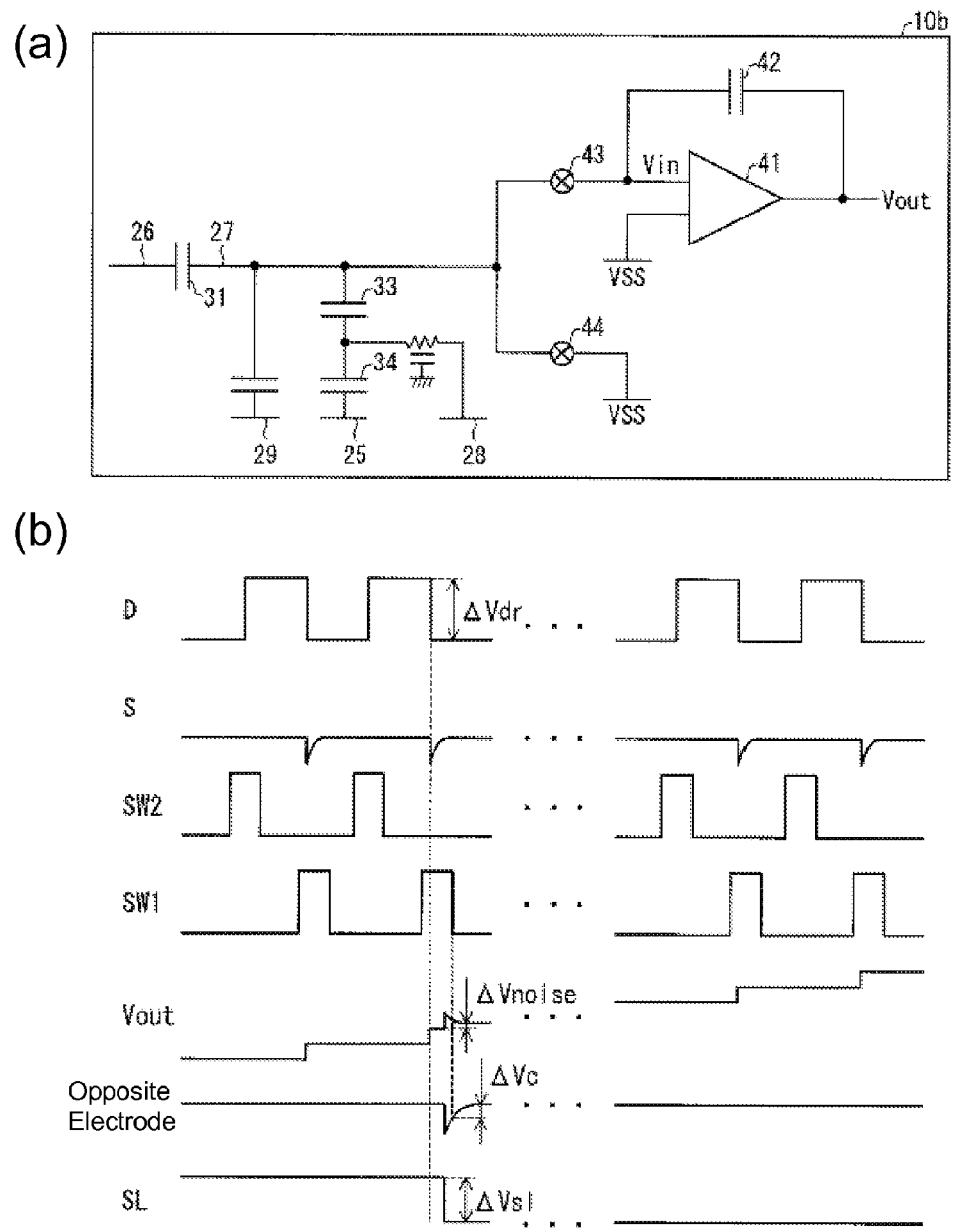
FIG. 7(*a*) shows an equivalent circuit of a touch panel-equipped display device that has a display part using a VA-type LCD.

DETAILED DESCRIPTION OF EMBODIMENTS (Configuration Example of Touch Panel-Equipped Display Device)

First, various configuration examples of a touch panel-equipped display device that can be realized as one embodiment of the present invention will be explained with reference to FIG. 2. A touch panel-equipped display device is a device that combines a display device for displaying texts, images, and videos with a touch panel for detecting a pressed position pressed by a finger or a touch stylus on a screen of the display device. In respective embodiments of the present invention, a liquid crystal display (LCD, liquid crystal display part) is used as an example of the display device, and a capacitive type touch panel is used as an example of the touch panel.

FIG. 2(*a*) shows a configuration of a touch panel-equipped display device in which a touch panel is disposed on a display screen. The touch panel-equipped display device is configured by disposing a touch panel 1 and a protective plate 4 on a display device constituted of polarizing plates 2 and display substrates 3.

FIG. 2(*b*) shows a configuration of an on-cell type touch panel-equipped display device. The touch panel 1 is disposed on one display substrate 3, and is sandwiched between the display substrate 3 and one polarizing plate 2.

FIGS. 2(*c*) and 2(*d*) show configurations of in-cell type touch panel-equipped display devices. In the in-cell type touch panel-equipped display device, display substrates sandwich one or both of a driving electrode and a detection electrode constituting a touch panel. In the case of the touch panel-equipped display device shown in FIG. 2(*c*), a layer 1*a* forming the driving electrode of the touch panel is sandwiched by the display substrates 3, and a layer 1b forming the detection electrode is sandwiched by one display substrate 3 and one polarizing plate 2. In the case of the touch panel-equipped display device shown in FIG. 2(d), the touch panel 1 is sandwiched by the display substrates 3. In this case, the driving electrode and the detection electrode constituting the touch panel may be formed in the same layer or may be formed in different layers.

The touch panel-equipped display device can have various configurations as described above, and the thickness of the touch panel-equipped display device is greatest in a typical configuration, and becomes smaller in the on-cell type and the in-cell type.

Embodiment 1

A touch panel-equipped display device of one embodiment of the present invention will be explained below with reference to FIGS. 3 to 9.

(Configuration of Touch Panel-Equipped Display Device 10)

The configuration of the touch panel-equipped display device 10 will be explained with reference to FIGS. 3 to 5 below. As shown in FIG. 3(a), the touch panel-equipped display device 10 includes a display control part 11, a display part 12, a touch panel control part 13, and a touch panel 14.

The display control part 11 outputs, to the display part 12, display control signals such as gate start pulse (GSP) and gate clock signals (GCK), and video signals (V). The display part 12 receives the display control signals and the video signals from the display control part, and displays image data.

The configuration of the display part 12 is shown in FIG. 3(b). The driving method adopted in this configuration is 3SSD (source shared driving). The display part 12 includes a source driver 21, a gate driver 22, display elements 23a, and a display element group 23b.

The display element group 23b includes a group of pixels of "m" pixels×"n" pixels ("m" and "n" are each a positive integer of 2 or greater). One pixel is constituted of respective display elements 23a of red (R), green (G), and blue (B), for example. In this case, the display element group 23b includes m×3n number of display elements 23a.

Each display element 23a includes a thin film transistor (TFT), a liquid crystal part, and a storage capacitance part (not shown in FIG. 3(b)). The configuration of the liquid crystal part may be a general configuration such as IPS (in-plane switching) or VA (vertical alignment).

The gate of the TFT included in each display element 23a is connected to a gate bus line (GL) 24, and an m number of GLs 24 are connected to the gate driver 22. The m number of GLs 24 are denoted by GL(1), GL(2), ..., GL(m−1), GL(m), respectively. The gate driver 22 receives GSP and GCK from the display control part 11.

On the other hand, the source of the TFT is connected to a source bus line (SL) 25, and a 3n number of SLs 25 are connected to the source driver 21. The 3n number of SLs 25 are denoted by SL(1R), SL(1G), SL(1B), SL(2R), SL(2G), SL(2B), ..., SL(n−1R), SL(n−1G), SL(n−1B), SL(nR), SL(nG), SL(nB), with three lines of RGB being one set.

One set of three SLs 25 is bundled into one V in the source driver 21. Therefore, an n number of V, which are V(1), V(2), ..., V(n−1), V(n), are inputted into the source driver 21 from the display control part 11.

In order to control the respective colors of RGB, the source driver 21 includes sampling lines (SMP(R), SMP(G), and SMP(B)) and sampling switches (SW(R), SW(G), and SW(B)), separately for each color of RGB.

In the touch panel-equipped display device 10, the display part 12 has the function of switching potentials of SLs 25 by the source driver 21 receiving V from the display control part 11 and outputting potentials to the SLs 25.

An M number of driving electrodes 26 (D(1), D(2), ..., D(M−1), D(M)) and an N number of detection electrodes 27 (S(1), S(2), ..., S(N−1), S(N)) are included in the touch panel 14.

The touch panel control part 13 generates touch panel driving signals as touch panel control signals, and outputs the touch panel driving signals to the driving electrodes 26 of the touch panel 14, together with a timing signal. By the touch panel driving signals inputted into the driving electrodes 26, detection signals are generated in the detection electrodes 27. The detection signals are outputted to the touch panel control part 13, and by the touch panel control part 13 processing the detection signals, it is determined whether an object to be detected was detected or not.

The sensing part is a part that drives a touch panel and that conducts detection in the touch panel control part 13 and the touch panel 14.

(Noise Through Capacitance (1))

Noise that is generated by switching potentials of the source bus lines, which can be a problem in the touch panel-equipped display device 10, will be explained with reference to FIGS. 2, 4, and 5.

FIG. 4 schematically shows a display part 12a having IPS liquid crystal as the display part of the touch panel-equipped display device. The touch panel-equipped display device having the IPS liquid crystal is a touch panel-equipped display device 10a. FIG. 4(a) shows a top view of the touch panel-equipped display device 10a, and FIG. 4(b) shows cross-sectional views along the line A-A' and along the line B-B' of FIG. 4(a). The touch panel-equipped display device 10a has the configuration of a typical touch panel-equipped display device shown in FIG. 2(a).

The touch panel 14 includes driving electrodes 26 and detection electrodes 27 arranged vertically and horizontally in a grid pattern. Respective gaps between the driving electrodes 26 and the detection electrodes 27 are optimized in accordance with the size of an object to be detected (finger, touch stylus, or the like), which is to be used. In the present embodiment, the touch panel 14 includes an M number of driving electrodes 26 and an N number of detection electrodes 27. The M number of driving electrodes 26 are denoted by D(1), D(2), ..., D(M−1), D(M). Similarly, the N number of detection electrodes are denoted by S(1), S(2), ..., S(N−1), S(N).

As shown in FIG. 4(b), the driving electrodes 26 and the detection electrodes 27 are respectively formed in different layers. The driving electrodes 26 and the detection electrodes 27 are insulated from each other by an insulating layer. In a layer below the driving electrodes 26, SLs 25 connected to the TFTs of the display elements 23a are formed. The SLs 25 are insulated from the driving electrodes 26 and the detection electrodes 27 by an insulating layer.

In the IPS liquid crystal, electrodes for driving liquid crystal and common electrodes are formed in substantially the same plane, but those electrodes are not shown in FIG. 4.

In the display part 12a having such a configuration, in terms of a direct current, the driving electrodes 26 and the detection electrodes 27 are insulated from each other, and the detection electrodes 27 and the SLs 25 are insulated from each other by an insulator, respectively, but in terms of an alternating current, the driving electrodes 26 and the detection electrodes 27 are capacitively-coupled, and the detection electrodes 27 and the SLs 25 are capacitively-coupled through a capacitance of the insulator, respectively. In other words, $C_{D-S}$ 31 is present between the driving electrodes 26 and the detection electrodes 27 as a capacitance, and $C_{SL-S}$ 32 is present between the SLs 25 and the detection electrodes 27 as a capacitance.

The $C_{SL-S}$ 32 is a main factor that affects the detection sensitivity of the touch panel. The reasons therefor will be explained below.

Figure 17:
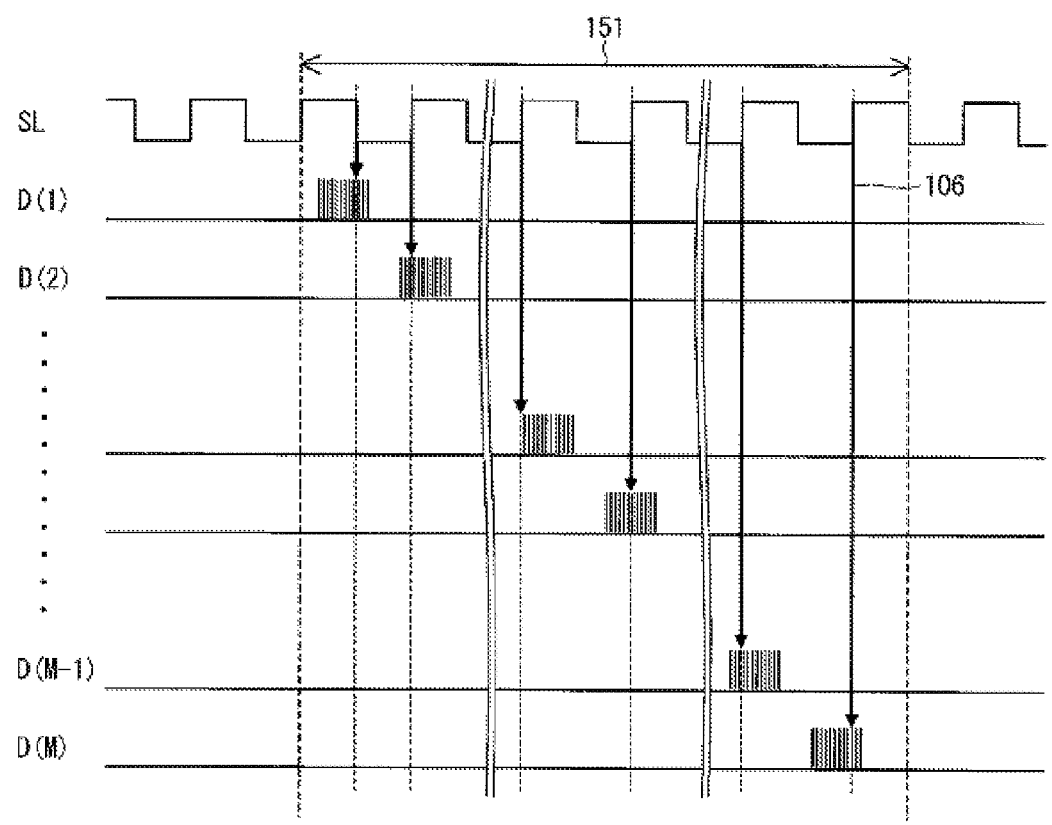
FIG. 17 shows a timing chart of a driving pulse for a touch panel and a source bus line signal in the conventional touch panel-equipped display device.

FIG. 17 is a timing chart for the SLs 25 (SL) and the driving electrodes 26(D), when driving a conventional touch panel-equipped display device. When the detection electrodes 27 detect electrical charges generated by pulse signals applied to the driving electrodes 26, in order to minimize the effect of noise, the sensing operation for the touch panel 14 is conducted during the vertical blanking period 151. However, Patent Document 1 discloses that it is preferable to switch the potentials of the SLs 25 at a certain frequency in order to maintain the display quality, even during the vertical blanking period 151 in which the display element group 23b is not driven.

Therefore, when conducting sensing for the touch panel 14 during the vertical blanking period 151 as shown in FIG. 17, the sensing timing and the timing of switching potentials of the SLs overlap at some points. This timing is the overlapping timing 106. At the timing 106, a change in potentials of the SLs is transferred to the detection electrodes 27 through the $C_{SL-S}$ 32, resulting in noise, and this causes the detection accuracy of the touch panel 14 to be lowered.

Next, noise through the capacitance will be explained in further detail with reference to an equivalent circuit diagram of the touch panel-equipped display device 10a of FIG. 5(a) and a timing chart of FIG. 5(b).

In addition to $C_{D-S}$ 31, which is an electrostatic capacitance, a fringe capacitance is formed between the driving electrodes 26 and the detection electrodes 27. The fringe capacitance can be separated into a component $C_{fs}$ that reacts to an object to be detected being close to or in contact with the touch panel, and a component $C_{f0}$ that does not react to the object to be detected. Therefore, the capacitance $C_f$ 35 formed between the driving electrodes 26 and the detection electrodes 27 is represented by $C_f = C_{fs} + C_{f0} + C_{D-S}$, when the object to be detected is not in the vicinity of or in contact with the touch panel. On the other hand, if the object to be detected is in the vicinity of or in contact with the touch panel, $C_{fs}$ is eliminated, resulting in $C_f = C_{f0} + C_{D-S}$.

The driving electrodes 26 are applied with a driving signal D shown in FIG. 5(b). A signal detected by the detection electrodes 27 is S. The detection electrodes 27 are virtually grounded to VSS, thereby having the same potential as VSS normally. The pulse waveform of D shown in this figure is an enlarged view of a time axis in the driving signal portion in D(1) to D(M) in the timing chart shown in FIG. 17. At this time, the size of the potential change of D is $\Delta V_{dr}$. SW(1) 43 controls a connection between a multiplier, which is made of an amp 41 and $C_{int}$ 42, and the detection electrodes 27. SW(2) 44 controls a connection between a reference potential VSS and the detection electrodes 27.

The touch panel-equipped display device 10 detects a voltage signal for determining whether an object to be detected is in contact or not by using an ascending period and a descending period of the pulse waveform of D. By turning on the SW(2) 44 in the ascending period, the detection electrodes 27 are initialized to the same potential as VSS. Next, by turning on the SW(1) 43 in the descending period, the detection electrodes 27 detect a potential change in the driving electrodes 26 as a potential. That is, in each descending period of D, a potential is generated momentarily in S. Because the detection electrodes 27 are virtually grounded to VSS, the potential generated momentarily in S is attenuated immediately, and the potential of S becomes the same as VSS (see FIG. 5(b)).

Where an electrical charge that is induced in the detection electrodes 27 during the descending period of D is Q, Q is derived by $\Delta V_{dr} \times C_f$. A potential $\Delta V_{det}$ generated on the detection electrodes 27 as a result of driving the touch panel is derived by $\Delta V_{det} = (\Delta V_{det} = (C_f)/C_j$, where $C_j$ is a received capacitance value of the detection electrodes 27.

The potential $\Delta V_{det}$ generated on the detection electrodes 27 is inputted to the multiplier made of the amp 41 and the $C_{int}$ 42, and after undergoing multiplication a prescribed times (i, for example), $\Delta V_{det}$ is outputted as $V_{out}$. Therefore, $V_{out} = i \times (\Delta V_{dr} \times C_f)/C_j$.

As described above, when an object to be detected enters a contact state from a non-contact state, the capacitance $C_f$ 35 formed between the driving electrodes 26 and the detection electrodes 27 changes from $C_f = C_{fs} + C_{f0} + C_{D-S}$ to $C_f = C_{f0} + C_{D-S}$. Because $\Delta V_{det}$ and $V_{out}$ change in accordance with the change in $C_f$ 35, when the object to be detected is not in contact, $V_{out}$ becomes large, and when the object to be detected is in contact, $V_{out}$ becomes small. By detecting the size of $V_{out}$ resulting from the change by a comparator or the like, it is possible to determine whether the object to be detected is in contact with a touch panel or not.

However, if there is an overlapping timing 106 shown in FIG. 17, in addition to the normal sensing for the touch panel, the potential change of SL is added to $V_{out}$ as noise through the capacitive coupling 105.

In the timing chart shown in FIG. 5(b), when the potential change generated upon potential switching of SL is $\Delta V_{sl}$, an electrical charge, which causes noise, is induced in the detection electrodes 27 due to the capacitive coupling 105 through $C_{SL-S}$ 32. This electric charge $Q_{noise}$ can be derived by $\Delta V_{sl} \times C_{SL-S}$. Thus, the potential $\Delta V_{noise}$ generated on the detection electrodes 27, which causes noise, is derived by $\Delta V_{noise} = (\Delta V_{sl} \times C_{SL-S})/C_j$.

Because $\Delta V_{noise}$ is added to $V_{out}$ as shown in FIG. 5(b), it prevents a contact of an object to be detected from being detected accurately, resulting in a reduction in detection sensitivity of the touch panel.

When the thickness of a touch panel-equipped display device is reduced as in an on-cell type or an in-cell type, the distance between the SLs 25 and the detection electrodes 27 is reduced. As a result, the touch panel becomes more susceptible to noise through the capacitive coupling 105.

(Noise Through Capacitance (2))

In the section of Noise through Capacitance (1), the touch panel-equipped display device 10a that has IPS liquid crystal in a display part of the touch panel-equipped display device was described. Below, with reference to FIGS. 6 and 7, noise in a touch panel-equipped display device 10b having VA liquid crystal in a display part thereof will be explained. The same components as those in the touch panel-equipped display device 10a are given the same reference characters, and the descriptions thereof are omitted.

FIG. 6 shows a schematic view of the touch panel-equipped display device 10b having VA liquid crystal in the display part of the touch panel-equipped display device. FIG. 6(a) shows a top view of the touch panel-equipped display device 10b, and FIG. 6(b) shows cross-sectional views along the line A-A' and along the line B-B' of FIG. 6(a). The touch panel-equipped display device 10b has the configuration of a typical touch panel-equipped display device shown in FIG. 2(a).

In the present embodiment, a description will be made on a typical touch panel-equipped display device, but a touch panel-equipped display device provided with an on-cell type touch panel or an in-cell type touch panel may also be used.

A display part 12b differs from the display part 12a in that an opposite electrode 28 for driving the VA liquid crystal is disposed between the SLs 25, and the driving electrodes 26 and the detection electrodes 27. The top view of FIG. 6(a) does not show the opposite electrode 28.

By having the opposite electrode 28, a capacitance $C_{SL-S}$ 32 is not directly formed between the SLs 25 and the detection electrodes 27. However, the following two types of capacitance are formed (see FIG. 6(b)). One of them is a capacitance formed between the opposite electrode 28 and the detection electrodes 27, which is $C_{C-S}$ 33. The other is a capacitance formed between the SLs 25 and the opposite electrode 28, which is $C_{SL-C}$ 34.

Next, noise through the capacitance will be explained with reference to an equivalent circuit diagram of the touch panel-equipped display device 10b of FIG. 7(a) and a timing chart of FIG. 7(b).

In the equivalent circuit diagram of the touch panel-equipped display device 10b shown in FIG. 7(a), many parts are the same as those in the touch panel-equipped display device 10a (FIG. 5(a)), but this equivalent circuit diagram differs in that the opposite electrode 28, $C_{C-S}$ 33 and $C_{SL-C}$ 34 are present between the SLs 25 and the detection electrodes 27.

The opposite electrode 28 has a very large time constant due to the inductance and the resistance value thereof, and once the opposite electrode 28 is electrically charged, it takes a long time for the electrical charges to disappear. Therefore, as shown with SL in FIG. 7(b), when the potential difference $\Delta V_{sl}$ is generated due to the potential switching of SL, a voltage $\Delta V_C$ is generated in the opposite electrode 28 through $C_{SL-C}$ 34. $\Delta V_C$ generated in the opposite electrode 28 is transferred to the detection electrodes 27 through $C_{C-S}$ 33, and causes $\Delta V_{noise}$ to be generated on the detection electrodes 27.

As described above, because the opposite electrode 28 has a very long time constant, the electrical charges are not attenuated to the original value within the ON period of SW1, and as a result, $\Delta V_{noise}$ generated in the detection electrodes 27 is not completely attenuated. Thus, $\Delta V_{noise}$ is added to $V_{out}$, causing the detection accuracy of the touch panel to be reduced.

When the thickness of a touch panel-equipped display device is reduced as in an on-cell type or an in-cell type, the distance between the SLs 25 and the detection electrodes 27 is reduced. As a result, the touch panel becomes more susceptible to the effect of noise through the capacitive coupling 105.

(Sensing Period and SL Inversion Period)

In the touch panel-equipped display device 10 of one embodiment of the present invention, by removing the effect of the above-mentioned noise to the sensing of the touch panel, the detection sensitivity of the touch panel can be improved. This configuration will be explained in detail below.

FIG. 1 shows a timing chart of SL and D(1), D(2), . . . , D(M−1), D(M) in the touch panel-equipped display device 10. As shown in the figure, in the touch panel-equipped display device 10, the potential of each source bus line 25 is switched during an SL potential switching period 54, which is a partial period of the vertical blanking period 51. In the sensing period 53, which is a period during the vertical blanking period 51 other than the partial period, a sensing operation for the touch panel 14 is conducted. This way, in the touch panel-equipped display device 10, the period for sensing the touch panel and the period for switching the potential of each source bus line 25 do not overlap. Therefore, it is possible to conduct sensing for the touch panel 14 without being affected by the noise generated by the potential switching (changing) of the source bus lines 25. As a result, highly sensitive touch detection can be achieved.

Because the frequency of the potential switching period for the source bus lines 25 can be appropriately set, it is possible to obtain the best timing that can achieve both a time period necessary for the sensing of the touch panel 14 and a display quality with ease.

The touch panel control part 13 shown in FIG. 3(a) receives, from the display control part 11, a timing signal that defines the SL potential switching period 54, and sets the sensing period 53 so as not to overlap the SL potential switching period 54 during the vertical blanking period 51. That is, the touch panel control part 13 sends a timing of the sensing period 53 to the driving electrodes 26 and the detection electrodes 27 of the touch panel 14, thereby driving the touch panel 14, while operating in synchronization with the display control part 11.

In the source driver 21 provided in the display part 12, sampling switches SW(R), SW(G), and SW(B) are always ON during the vertical blanking period 51. The source driver 21 receives the timing of the SL potential switching through V(1) to V(n), and conducts the SL potential switching for the SLs 25 at a timing that does not overlap the sensing period 53.

The timings for the sensing period 53 and the SL potential switching period 54 during the vertical blanking period 51 can be appropriately set depending on the display quality required in the display device, a time period necessary for sensing one line of the touch panel, and the like.

As one example of the timing, in the timing chart of FIG. 1, the potentials of SLs are switched at an interval (2H) of twice as long as the horizontal scanning period (H). The touch panel control part 13 and the touch panel 14 conducts sensing for the touch panel during the 2H period. That is, every time the sensing part conducts the sensing, the SL potential switching part switches the potentials of SLs.

Figure 8:
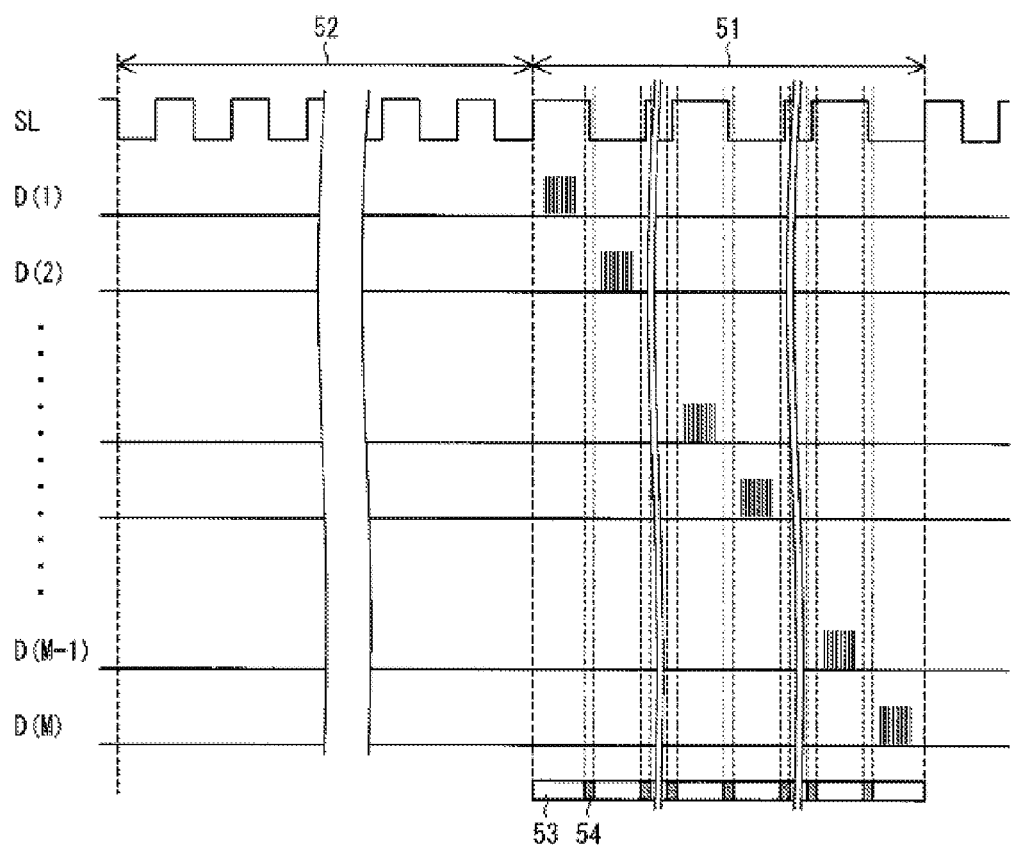
FIG. 8 shows a timing chart of a driving signal for a touch panel and a source bus line signal in a touch panel-equipped display device of one embodiment of the present invention.
Figure 9:
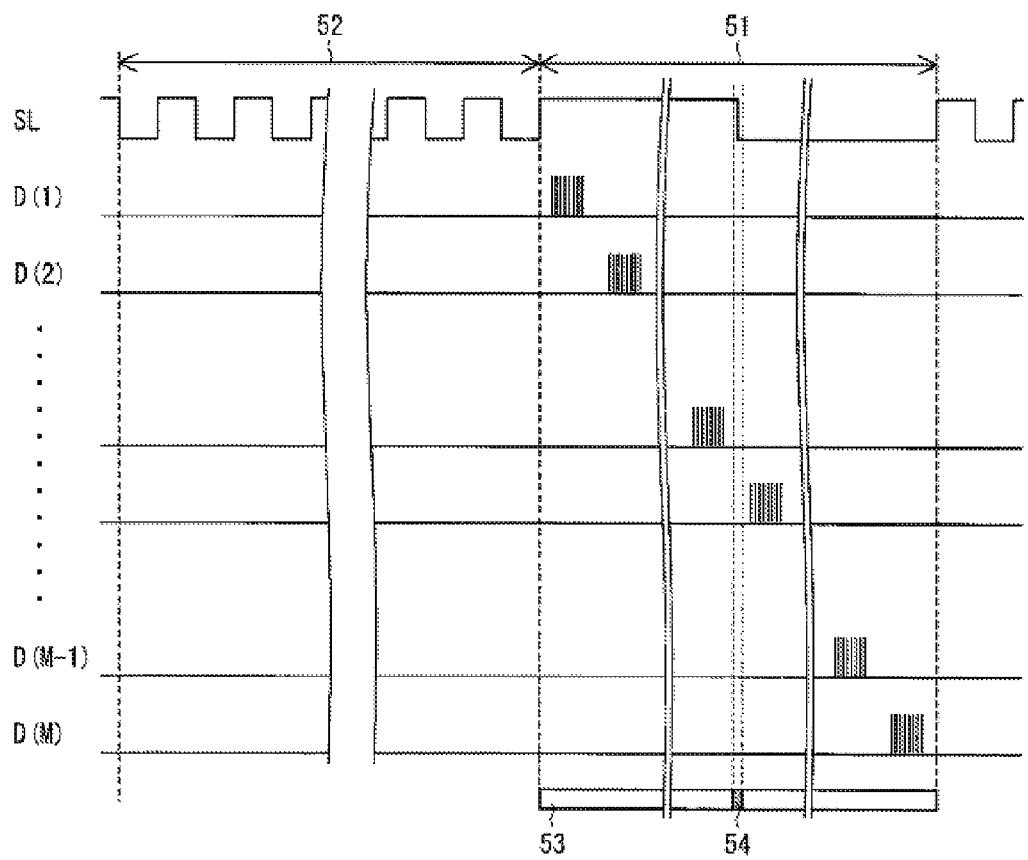
FIG. 9 shows a timing chart of a driving pulse for a touch panel and a source bus line signal in a touch panel-equipped display device of one embodiment of the present invention.

Other examples of the timing are shown in the timing charts of FIGS. 8 and 9.

FIG. 8 shows the timing chart of FIG. 1 in which the interval for the SL potential switching has been changed, showing the vertical blanking period 51 and the display period 52. During the display period 52, the potentials of SLs are inverted at an interval of H to prevent the deterioration of liquid crystal.

When the display period 52 is ended, and the vertical blanking period 51 is started, the potentials of the SLs are switched at an interval of 1.5H. The sensing operation for the touch panel 14 is conducted during the 1.5H interval. Every time the sensing part conducts the sensing, the SL potential switching part switches the potentials of SLs.

FIG. 9 shows the vertical blanking period 51 and the display period 52, and illustrates a case in which the vertical blanking period 51 has one SL potential switching period 54. During the display period 52, the SLs are driven at an interval of 1H, as in the example shown in FIG. 8.

When the vertical blanking period 51 is started, the SL potential is fixed, and the sensing period 53 is started. At the center of the vertical blanking period, the SL potential switching period 54 is started. Here, the sensing of the touch panel is stopped, and the potential switching for the SLs is conducted. Thereafter, the sensing period 53 resumes, and the sensing period 53 is ended at the end of the vertical blanking period 51.

By controlling the sensing period 53 and the SL potential switching period 54 as described above, the touch panel-equipped display device 10 can eliminate the effect of the potential switching for the SLs 25, and therefore, it is possible to improve the sensitivity in detecting whether an object is in contact with the touch panel or not.

The length of the sensing period 53 and the interval between the SL potential switching periods 54 are not limited to 2H shown in FIG. 1 or 1.5H shown in FIG. 8, and it is possible to set the length and the interval appropriately such as an integral multiple of 1H.

Embodiment 2

Embodiment 2 of the present invention will be explained below with reference to FIG. 10. The same components as those in Embodiment 1 above are given the same reference characters, and the descriptions thereof will be omitted.

FIG. 10(a) shows a block diagram of a touch panel-equipped display device 60. FIG. 10(b) shows a configuration of a display part 62 provided in the touch panel-equipped display device 60. As shown in these figures, the touch panel-equipped display device 60 is made of a display control part 11, the display part 62, a touch panel control part 13, and a touch panel 14.

The display part 62 includes a polarity switching driver 29 for controlling the potential of each SL 25, in addition to the source driver 21 for controlling the potential of each SL 25. The polarity switching driver 29 includes a potential polarity switching line (PV), an all on line (AON), and all on switches (SW(AON)). PV and AON are connected to an external IC not shown in FIG. 10(b), and are controlled by the external IC. PV outputs potentials to the SLs 25 during the vertical blanking period 51, and switches the potentials at a prescribed timing. SW(AON) are switches for connecting and disconnecting PV and the respective SLs 25, and are controlled by signals from AON.

In the present embodiment, in the touch panel-equipped display device 60, SMP(R) to SMP(B) are all off during the vertical blanking period 51. During the SL potential switching period 54 in the vertical blanking period 51, by turning on the AON, a prescribed potential is outputted to each SL from PV. In other words, by controlling the SW(AON) in the polarity switching driver 29 that is different from the source driver 21, the potentials of SLs 25 can be switched during the SL potential switching period 54. The timings of the sensing period 53 and the SL potential switching period 54 during the vertical blanking period 51 can be set appropriately as long as the two periods do not overlap. For example, the SL potential switching period 54 can be set to the same timing as in FIGS. 1, 8, and 9 described in Embodiment 1.

The benefits of using a different driver for outputting potentials to SLs 25 between the display period 52 and the vertical blanking period 51 will be explained below.

The potentials outputted to SLs 25 during the display period 52 are potentials for controlling the display elements 23a. When 3SSD is adopted as the driving method of the source driver 21 as shown in FIG. 10(b), it is necessary to output potentials to the SLs 25 3m times ((m number of GLs 24)×(subpixels RGB)) during the display period 52. Thus, each potential output time is made shorter. In order to charge the source bus lines sufficiently during the short potential output time, it is necessary to use large switches as SW(R), SW(G), and SW(B).

On the other hand, in the vertical blanking period 51, each potential output time to SL 25 can be made longer than the potential output time during the display period 52. Therefore, even when smaller switches are used for SW(AON) than SW(R), SW(G), and SW(B), it is possible to output a sufficient potential to the SLs 25.

A smaller switch consumes less power than a larger switch. Therefore, by using the polarity switching driver 29 for switching potentials during the vertical blanking period 51, instead of the source driver 21, the power consumption of the touch panel-equipped display device can be reduced while improving the detection sensitivity thereof.

Embodiment 3

Embodiment 3 of the present invention will be explained below with reference to FIGS. 11 and 12. The same components as those in Embodiments 1 and 2 above are given the same reference characters, and the descriptions thereof will be omitted.

(Configuration of Touch Panel-Equipped Display Device 70)

FIG. 11(a) shows a block diagram of a touch panel-equipped display device 70 of the present embodiment. As shown in the figure, the touch panel-equipped display device 70 includes a touch panel electrode built-in display part 72 and a switch 75, in addition to the display control part 11 and the touch panel control part 13.

The touch panel electrode built-in display part 72 includes a capacitive type in-cell touch panel shown in FIG. 2(d) as a touch panel. In the touch panel electrode built-in display part 72, a COM electrode in each display element 23a of the LCD is commonly used as a driving electrode and a detection electrode for a touch panel. This electrode will be referred to as a COM electrode doubling as a driving electrode.

For ease of explanation, FIG. 11(a) shows only one switch 75, but in the actual touch panel-equipped display device 70, a switch 75 is provided for each COM electrode doubling as a driving electrode. By controlling the switch 75 connected to each COM electrode doubling as a driving electrode, it is determined which of a COM signal for display and a driving signal for touch detection is to be inputted to the COM electrode doubling as a driving electrode.

If the LCD has display elements 23a of m pixels×3n pixels, the LCD is provided with the same number of COM electrodes. These COM electrodes are separated into blocks of a size corresponding to the size of an object to be detected, and an M number of COM electrodes doubling as driving electrodes and an N number of COM electrodes doubling as detection electrodes are obtained. The M number of COM electrodes doubling as driving electrodes are denoted by COM(1), COM(2), . . . , COM(M−1), and COM(M).

(Timing Chart)

The timing chart of the SLs and COM electrodes doubling as driving electrodes is shown in FIG. 11(b). In the example of this figure, the touch panel-equipped display device 70 conducts SL potential switching once during the vertical blanking period 51. The COM electrodes doubling as driving electrodes function as COM electrodes by being connected to the display control part 11 by the switch 75 during the display period 52, thereby conducting image display. On the other hand, during the vertical blanking period 51, the COM electrodes doubling as driving electrodes function as driving electrodes for the touch panel by being connected to the touch panel control part 13 by the switch 75. That is, during the sensing period 53, driving pulses are generated sequentially, starting from COM(1), and during the SL potential switching period 54, the generation of driving pulse is stopped. When the sensing period 53 is started again, the generation of the driving pulse is resumed.

As described above, the touch panel-equipped display device 70 provided with a capacitive in-cell touch panel can improve the detection sensitivity of the touch panel, while achieving thin-profile.

Figure 12:
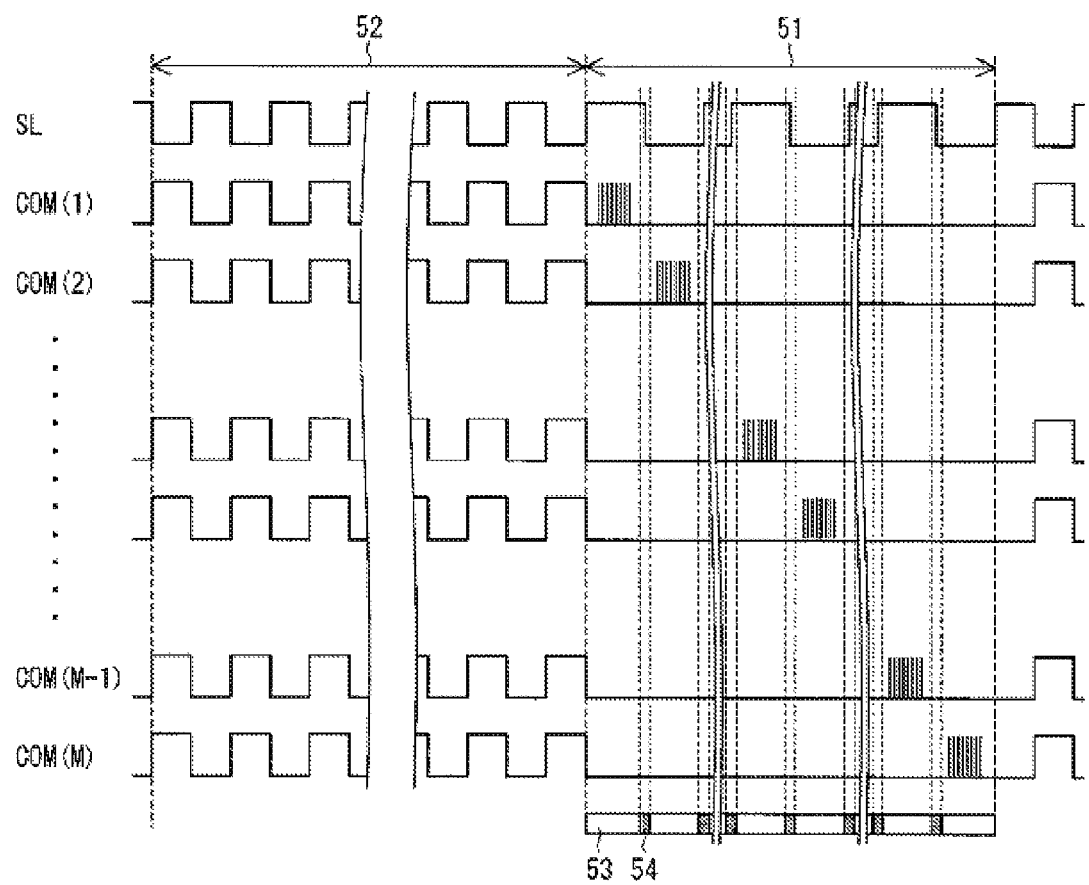
FIG. 12 is a timing chart of a driving pulse for a touch panel and a source bus line signal in an in-cell type touch panel-equipped display device of one embodiment of the present invention.

The timing chart of the SLs and the COM electrodes doubling as driving electrodes shown in FIG. 12 is a modification example of the timing chart shown in FIG. 11(*b*), and shows a case in which the SL potential switching is conducted every time any one of D(1) to D(M) is driven. The interval of the SL potential switching is 1.5H, and the frequency of the SL potential switching is increased as compared to FIG. 11(*b*). By increasing the frequency of the SL potential switching, it is expected to improve the display quality and to mitigate flickering.

Embodiment 4

Embodiment 4 of the present invention will be explained below with reference to FIGS. 13 to 15. The same components as those in Embodiments 1 to 3 are given the same reference characters, and the descriptions thereof will be omitted.

In the touch panel-equipped display device 10 of the present embodiment, the interval of driving pulses that are generated in the touch panel control part 13 and provided to D(1) to D(M) sequentially is set independent of the interval of the SL potential switching period 54. On the other hand, the potentials of the SLs are switched by the display control part 11 at an interval of 1H. This operation is shown in FIG. 13.

By the generation of the driving pulses and the SL potential switching being conducted at different intervals, the driving pulses and the SL potential switching periods 54 partially overlap. The touch panel control part 13 receives timing signals for the SL potential switching periods 54 from the display control part 11, and in the overlapping periods, the touch panel control part 13 stops the generation of the driving pulse, such that the driving pulse and the SL potential switching periods 54 do not overlap.

Thereafter, when the SL potential switching period 54 is ended, the touch panel control part 13 resumes the generation of driving pulse.

By stopping and resuming the generation of the driving pulse, even when the generation of the driving pulses and the SL potential switching periods have different intervals independent of each other, it is possible to remove the effect of noise caused by the SL potential switching. By setting the interval of the SL potential switching period 54 to 1H, it is possible to increase the frequency of switching the SL potentials during the vertical blanking period 51. Thus, the detection sensitivity of the touch panel can be improved.

Figure 13:
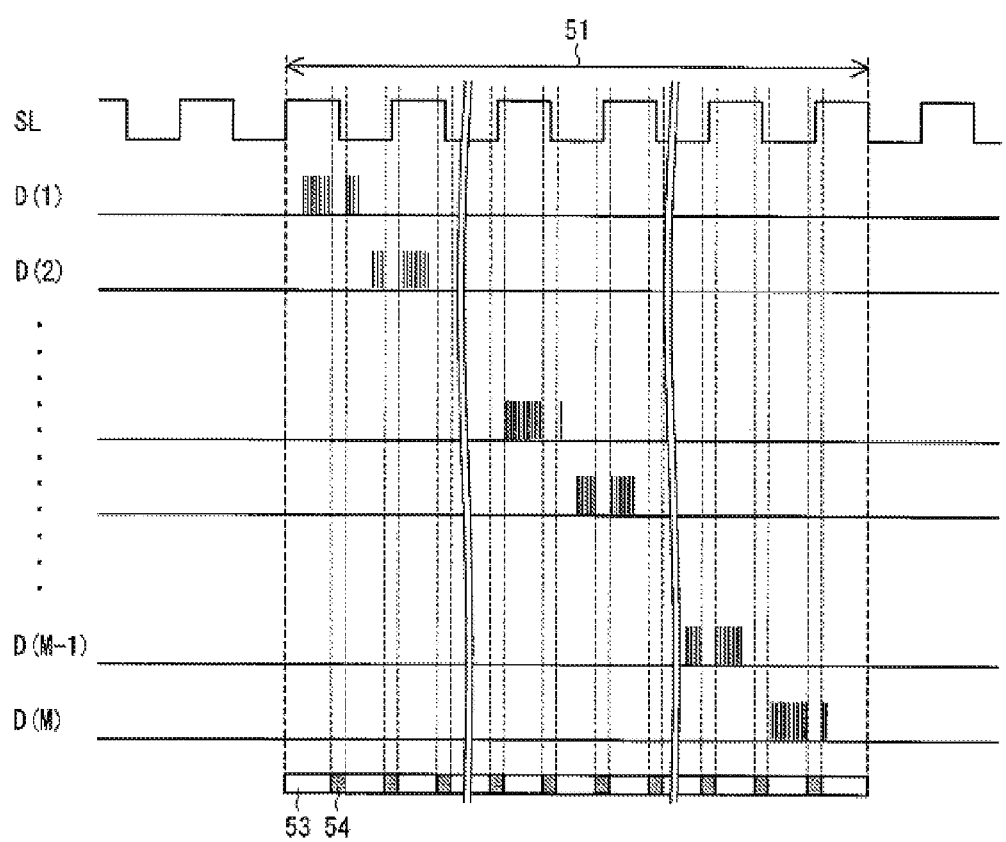
FIG. 13 is a timing chart of a driving signal for a touch panel and a source bus line signal in a touch panel-equipped display device of one embodiment of the present invention.
Figure 14:
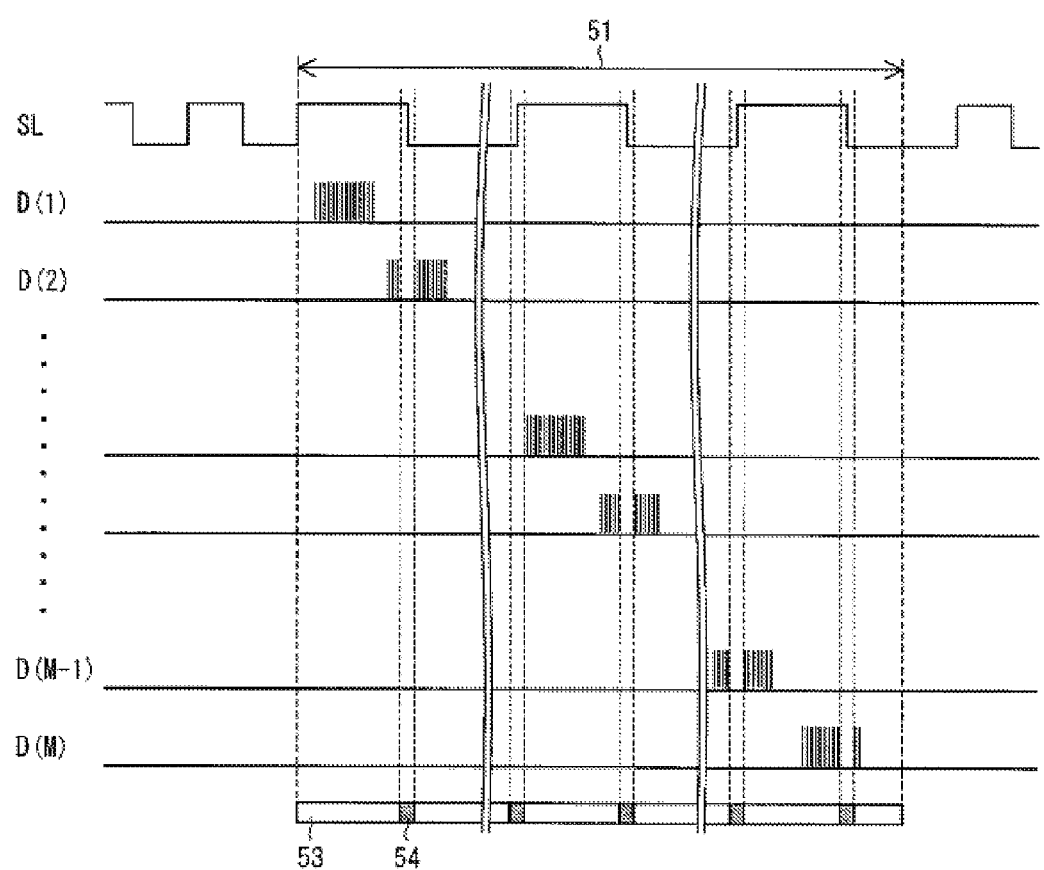
FIG. 14 is a timing chart of a driving signal for a touch panel and a source bus line signal in a touch panel-equipped display device of one embodiment of the present invention.
Figure 15:
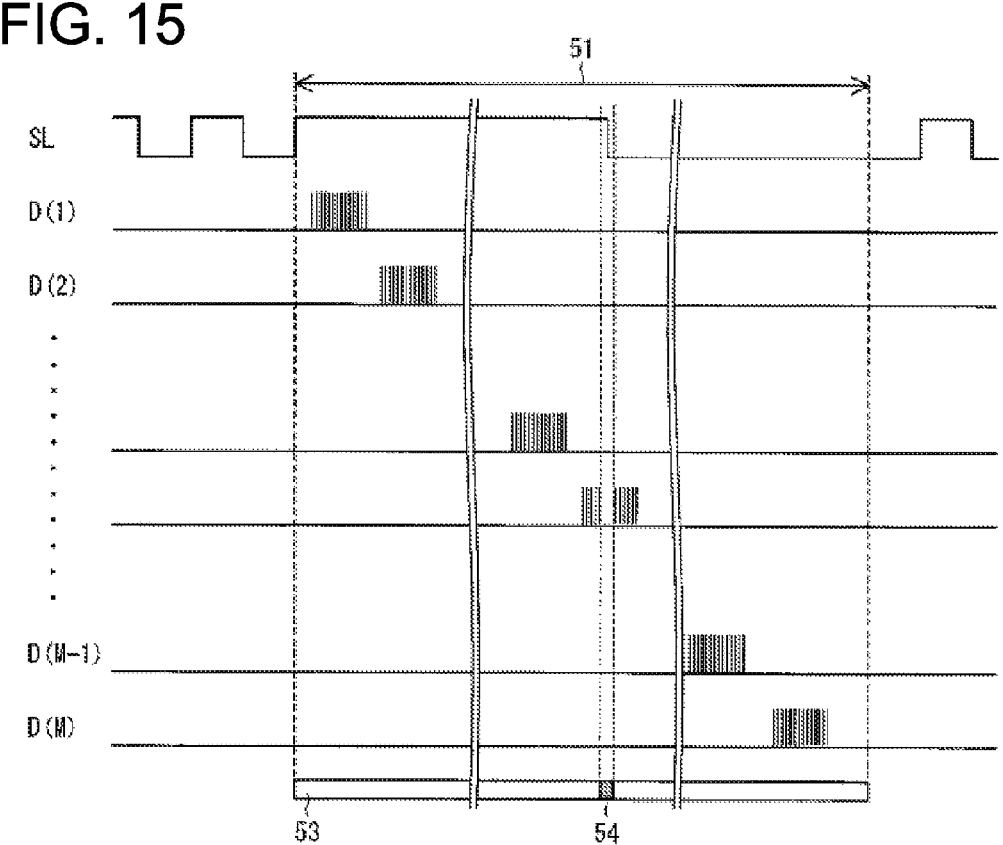
FIG. 15 is a timing chart of a driving pulse for a touch panel and a source bus line signal in a touch panel-equipped display device of one embodiment of the present invention.
Figure 16:
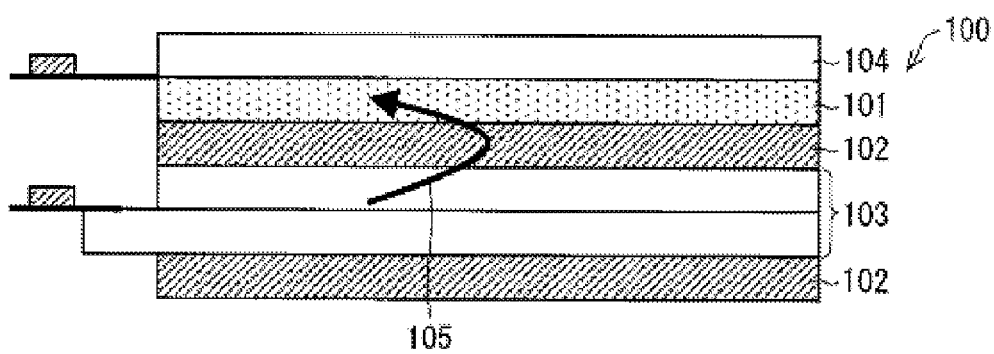
FIG. 16 is a cross-sectional view schematically showing a conventional touch panel-equipped display device.

Examples of conducting the generation of the driving pulse and the SL potential switching at different intervals independent of each other are not limited to the example shown in FIG. 13 (the interval of the SL potential switching is 1H), but may include the cases shown in FIGS. 14 and 15. The example shown in FIG. 14 is similar to FIG. 13 in the length and interval of the driving pulse generating periods, but the interval of the SL potential switching is set to 2H. The example shown in FIG. 15 is similar to FIG. 13 in the length and interval of the driving pulse generating periods, but the SL potential switching is conducted once during the vertical blanking period 51. In any case, the effect of the highly accurate sensing can be obtained by avoiding the noise from SL.

As described above, in the case in which the driving pulse generation and the SL potential switching period 54 overlap each other, even when the generation of driving pulse is stopped during the SL potential switching period 54, the interval of the SL potential switching and the frequency of the SL potential switching can be appropriately set.

The present invention is not limited to the embodiments described above, and various modifications can be made without departing from the scope of the claims. Therefore, embodiments obtained by appropriately combining the techniques disclosed in different embodiments are included in the technical scope of the present invention.

For example, the touch panel in the touch panel-equipped display device 10 of one embodiment of the present invention is not limited to a capacitive type touch panel. That is, any touch panel can be employed as long as the touch panel is configured such that a detected signal is outputted to the outside of the display part as a current or a voltage. Therefore, even with a resistive touch panel or an optical sensor touch panel, the effects of the present invention can also be achieved.

<Summary>

In order to solve the above-mentioned problem, a touch panel-equipped display device of one embodiment of the present invention includes: a touch panel; a display part having source bus lines; a source bus line potential switching part that switches potentials of the source bus lines during a source bus line potential switching period that is a partial period of a vertical blanking period of the display device; and a sensing part that conducts sensing for the touch panel in a sensing period that is a period in the vertical blanking period other than the partial period.

With this configuration, in the touch panel-equipped display device according to one embodiment of the present invention, a period for sensing the touch panel and a period for switching the potentials of the source bus lines do not overlap. This makes it possible to conduct sensing for a touch panel without being affected by the potential switching (changing) of the source bus lines. As a result, highly sensitive touch detection can be achieved.

In order to solve the above-mentioned problem, a control method for a touch panel-equipped display device of one embodiment of the present invention is a control method for a touch panel-equipped display device provided with a touch panel and a display part having source bus lines, the method including: a source bus line potential switching step of switching potentials of the source bus lines during a source bus line potential switching period that is a partial period of a vertical blanking period of the display device; and a sensing step of conducting sensing for the touch panel during a sensing period that is a period of the vertical blanking period other than the partial period.

With the above-mentioned configuration, in the touch panel-equipped display device, it is possible to eliminate an effect of noise caused by potential switching of the source bus lines, and it is possible to achieve highly sensitive touch detection.

In the touch panel-equipped display device of one embodiment of the present invention, it is preferable that the sensing part receive a timing signal that defines a timing of the source bus line potential switching period from the source bus line potential switching part, and that the sensing part set the sensing period so as not to overlap the source bus line potential switching period based on the timing signal.

With this configuration, it is possible to reliably control the touch panel sensing period and the source bus line potential switching period without having them overlap each other.

In the touch panel-equipped display device of one embodiment of the present invention, it is preferable that the source bus line potential switching period be started at an end of each sensing period.

With this configuration, it is possible to increase the frequency of the source bus line potential switching period during the vertical blanking period, which allows for a reduction in flickering and an improvement of the display quality of the display device.

In the touch panel-equipped display device of one embodiment of the present invention, it is preferable that the sensing part conduct sensing for the touch panel during a sensing period at a certain interval, and that, when it is determined that the sensing period overlaps the source bus line potential switching period based on the timing signal, the sensing part stop the sensing period during the source bus line potential switching period, and resume the sensing period when the source bus line potential switching period is ended.

With this configuration, even when the timing of the sensing period for the touch panel and the timing of the source bus line potential switching period for the display part are set independently of each other, it is possible to reliably control the timings of the sensing period and the source bus line potential switching period without having them overlap each other.

In the touch panel-equipped device of one embodiment of the present invention, it is preferable to further include a source driver that outputs image signals to the source bus lines, and it is preferable that the source bus line potential switching part be provided separately from the source driver.

With this configuration, it is possible to use a small switch with less power consumption as a switch that controls a connection between a source bus line and a signal line. This makes it possible to reduce the power consumption in driving the touch panel-equipped display device while improving the detection sensitivity of the touch panel-equipped display device.

In the touch panel-equipped display device of one embodiment of the present invention, it is preferable to further include a source driver that outputs image signals to the source bus lines, and it is preferable that the source bus line potential switching part be provided separately from the source driver.

With this configuration, it is possible to provide a touch panel-equipped display device with thin-profile, lightweight, and low power consumption.

In the touch panel-equipped display device of one embodiment of the present invention, it is preferable that the touch panel be an in-cell type touch panel.

With this configuration, the touch panel-equipped display device can be made even thinner. On the other hand, by making the touch panel-equipped display device thinner, the noise caused by the potential change in the source bus lines tends to be larger. However, by employing one embodiment of the present invention, it is possible to provide a thin-profile touch panel-equipped display device that can detect whether an object to be detected is in contact with a touch panel or not with higher sensitivity.

In the touch panel-equipped display device of one embodiment of the present invention, it is preferable that the display part be a liquid crystal display part.

With this configuration, it is possible to provide a touch panel-equipped display device with thin-profile, lightweight, and low power consumption.

INDUSTRIAL APPLICABILITY

The present invention can be used for a touch panel-equipped display device.

DESCRIPTION OF REFERENCE CHARACTERS 10 touch panel-equipped display device
11 display control part (source bus line potential switching part)
12 display part
13 touch panel control part (sensing part)
14 touch panel
21 source driver
22 gate driver
23a display element
23b display element group
24 gate bus line (GL)
25 source bus line (SL)
26 driving electrode
27 detection electrode
28 opposite electrode
29 polarity switching driver
30 vertical blanking period
51 display period
52 sensing period
53 potential switching period (source bus line potential switching period)
54 touch panel-equipped display device
62 display part
70 touch panel-equipped display device
72 display part

The invention claimed is:

1. A touch panel-equipped display device, comprising:
a touch panel;
a display unit having source bus lines;
a source bus line potential switching unit that switches a potential of the source bus lines at a switching timing, the switching timing occurring during a vertical blanking period of the display device; and
a sensing unit that conducts sensing for a touch panel during a sensing period that is a period in the vertical blanking period,
wherein the sensing period and the switching timing are set such that the sensing period does not overlap the switching timing,
wherein the sensing unit receives, from the source bus line potential switching unit, a timing signal that defines said switching timing, and the sensing unit sets the sensing period so as not to overlap said switching timing based on the timing signal, and
wherein the sensing unit conducts sensing for the touch panel during a sensing period that repeatedly occurs at a certain interval, and when the sensing unit determines, based on the timing signal, that the sensing period and the switching timing would overlap, the sensing unit discontinues the sensing period prior to the switching timing, and resumes the sensing period after the switching timing.

2. The touch panel-equipped display device according to claim 1,
wherein the switching timing occurs every time after sensing period is ended.

3. The touch panel-equipped display device according to claim 1, further comprising a source driver that outputs image signals to the source bus lines, wherein the source bus line potential switching unit is provided separately from the source driver.

4. The touch panel-equipped display device according to claim 1,
wherein the touch panel is a capacitive type touch panel.

5. The touch panel-equipped display device according to claim 3,
wherein the touch panel is an in-cell type touch panel.

6. The touch panel-equipped display device according to claim 1,
wherein the display unit is a liquid crystal display unit.

* * * * *